No. 796,797. PATENTED AUG. 8, 1905.
G. R. BLACKBURN.
CLAMP FOR ATTACHING GROUND WIRES.
APPLICATION FILED OCT. 21, 1904.

Witnesses
M. A. Schmidt.
Geo. E. Tew.

Inventor
George R. Blackburn,
by Milo B. Stevens & Co.
Attorneys.

UNITED STATES PATENT OFFICE.

GEORGE R. BLACKBURN, OF CLEVELAND, OHIO.

CLAMP FOR ATTACHING GROUND-WIRES.

No. 796,797. Specification of Letters Patent. Patented Aug. 8, 1905.

Application filed October 21, 1904. Serial No. 229,452.

*To all whom it may concern:*

Be it known that I, GEORGE R. BLACKBURN, a citizen of the United States, residing at Cleveland, in the county of Cuyahoga and State of Ohio, have invented new and useful Improvements in Clamps for Attaching Ground-Wires, of which the following is a specification.

This invention is a device adapted to be employed to attach the ground-wires of electric-circuit conductors to gas or water pipes, and comprises a clamp constructed to hold the ground-wire and securely connect the same to the pipe. It is characterized by facility and ease of attachment and detachment and is adjustable to suit pipes of various sizes.

Figure 2:
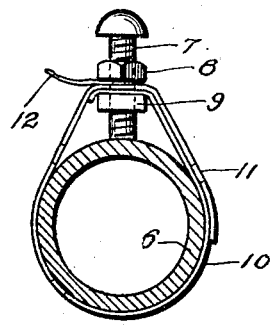
Figure 1:
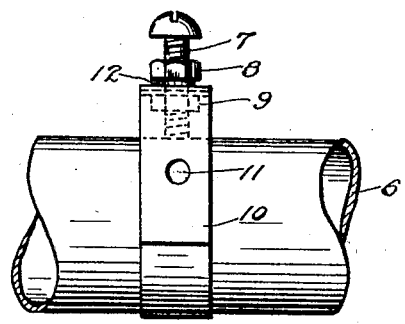

In the accompanying drawings, Figure 1 is a side elevation of the invention, and Fig. 2 is an end elevation thereof.

Referring specifically to the drawings, 6 indicates an ordinary gas or water pipe.

7 is a screw having thereon binding-nuts 8 and 9.

10 is a strip of flexible metal having in the ends a series of perforations 11 of proper size to receive the screw 7. A series of perforations is provided so that the strip may be used on pipes of various sizes.

The ground-wire is indicated at 12.

In use the strip 10 is placed around the pipe and its ends overlapped, with the holes 11 registering. The nuts 7 and 8 are then put in place above and below the laps and the screw put through and screwed up until its foot bears against the pipe and draws the strip 10 in close and tight contact therewith. The ground-wire is engaged around the screw and bound against the strip by tightening the nut 8. A single screw thus serves to clamp the pipe and bind the ground-wire. By loosening the nut 8 the ground-wire may be detached without loosening or detaching the clamp.

The facility and cheapness of the device are obvious. No special parts or castings are required, since stock screws and nuts may be used, and the perforated strips may be produced in large quantities at small cost. No soldering is required, and the pieces do not have to be assembled or secured together until they are used; but for convenience, if desired, the nut 9 may be soldered to the strip 10 in advance.

What I claim as new, and desire to secure by Letters Patent, is—

1. In a clamp for connecting a ground-wire to a pipe, in combination, a flexible strip, adapted to be looped around the pipe, a screw engaging the ends of the strip and arranged to bear at its foot against the pipe to tighten the strip, and means to bind the wire to the strip.

2. In a clamp for connecting a ground-wire to a pipe, in combination, a flexible strip lapped at its ends and looped around the pipe, and a screw which extends through the lapped ends of the strip and bears at its foot against the pipe and has thereon binding-nuts between which the ends of the strip and the ground-wire are clamped.

3. In a clamp for connecting a ground-wire to a pipe, in combination, a flexible metal strip having perforations in its ends and adapted to be looped around the pipe, a screw which fits through said perforations and is arranged to bear at its foot against the pipe, and nuts on the screw, between which the ground-wire and ends of the strip are bound.

In testimony whereof I have signed my name to this specification in the presence of two subscribing witnesses.

GEORGE R. BLACKBURN.

Witnesses:
JOHN A. BOMMHARDT,
LOTTIE NEWBURN.